US011980233B2

(12) United States Patent
Liu et al.

(10) Patent No.: US 11,980,233 B2
(45) Date of Patent: May 14, 2024

(54) WORKING CONTROL CIRCUIT FOR ULTRASONIC ATOMIZER AND ULTRASONIC ELECTRONIC CIGARETTE

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Xinqiang Yin, Hunan (CN); Jianhua Yi, Hunan (CN); Shengbo Li, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 730 days.

(21) Appl. No.: 17/251,764

(22) PCT Filed: Jun. 12, 2019

(86) PCT No.: PCT/CN2019/090913
§ 371 (c)(1),
(2) Date: Dec. 11, 2020

(87) PCT Pub. No.: WO2019/238064
PCT Pub. Date: Dec. 19, 2019

(65) Prior Publication Data
US 2021/0120880 A1    Apr. 29, 2021

(30) Foreign Application Priority Data
Jun. 14, 2018  (CN) .......................... 201820921088.4

(51) Int. Cl.
*A24F 40/50* (2020.01)
*A24F 40/05* (2020.01)
*H02M 3/156* (2006.01)

(52) U.S. Cl.
CPC .............. *A24F 40/50* (2020.01); *A24F 40/05* (2020.01); *H02M 3/156* (2013.01)

(58) Field of Classification Search
CPC ................................ A24F 40/50; A24F 40/05
See application file for complete search history.

(56) References Cited

U.S. PATENT DOCUMENTS

| | | | |
|---|---|---|---|
| 11,431,242 B2 * | 8/2022 | Liu | A24F 40/05 |
| 2010/0200008 A1 * | 8/2010 | Taieb | A24F 40/50 |
| | | | 131/360 |

(Continued)

FOREIGN PATENT DOCUMENTS

| | | |
|---|---|---|
| CN | 206258688 U | 6/2017 |
| CN | 107411174 A | 12/2017 |
| CN | 208367566 U | 1/2019 |

OTHER PUBLICATIONS

International Search Report issued in International Application No. PCT/CN2019/090913 dated Sep. 11, 2019, 2 pages.

*Primary Examiner* — Neil Abrams
(74) *Attorney, Agent, or Firm* — MASCHOFF BRENNAN; Ran Pang; Michael Mauriel

(57) ABSTRACT

A working control circuit for an ultrasonic atomizer and an ultrasonic electronic cigarette are disclosed. The working control circuit comprises a power module, a booster circuit, a smoking switch, a controller, a drive circuit, and an LC oscillation circuit. An output end of the booster circuit is also connected to the drive circuit through a voltage regulator circuit. The voltage regulator circuit comprises a first MOS transistor, a first resistor, and a second resistor. A reference level feedback end of the booster circuit is grounded through (Continued)

a third resistor. The voltage output end of the booster circuit is electrically connected to the reference level feedback end of the booster circuit through a fourth resistor.

12 Claims, 3 Drawing Sheets

(56) References Cited

U.S. PATENT DOCUMENTS

| | | | |
|---|---|---|---|
| 2018/0161525 A1* | 6/2018 | Liu | A61M 15/001 |
| 2020/0253279 A1* | 8/2020 | Liu | A24F 40/05 |
| 2021/0120880 A1* | 4/2021 | Liu | A24F 40/50 |

* cited by examiner

WORKING CONTROL CIRCUIT FOR ULTRASONIC ATOMIZER AND ULTRASONIC ELECTRONIC CIGARETTE

CROSS REFERENCE TO RELATED APPLICATIONS

This application is a U.S. National Phase application under 35 U.S.C. § 371 of International Application No. PCT/CN2019/090913 filed on Jun. 12, 2019, which claims priority to Chinese Application No. 201820921088.4 filed on Jun. 14, 2018. The entire contents of these applications are hereby incorporated herein by reference.

FIELD OF THE INVENTION

The present invention particularly relates to a working control circuit for an ultrasonic atomizer and an ultrasonic electronic cigarette.

BACKGROUND OF THE INVENTION

As shown in FIG. 1, a working control circuit for an existing ultrasonic atomizer comprises a power module 1, a booster circuit 2, a smoking switch 3, a controller 4, a drive circuit 7 and an LC oscillation circuit 5. The power module 1 is electrically connected to an ultrasonic atomizer J sequentially through the booster circuit 2, the drive circuit 7, and the LC oscillation circuit 5. The smoking switch 3 is electrically connected to an input end of the controller 4, and an output end of the controller 4 is electrically connected to an enable end of the booster circuit 2. When the smoking switch 3 is pressed down, the controller 4 detects a potential change of the input end, so that the controller 4 controls the booster circuit 2 to work. The voltage outputted by the power module 1 is boosted by the booster circuit 2 to a preset voltage value, and then the ultrasonic atomizer is driven to work with the constant preset voltage value.

In order to avoid the phenomenon of dry burning of the ultrasonic atomizer J when the smoking switch 3 is continuously conducted for many times, and to prevent shortening the life of the ultrasonic atomizer J due to excessive working voltage, the power of the ultrasonic atomizer J should be controlled, so that the voltage value outputted by the booster circuit 2 is small.

Due to the problems of overcooling of the ultrasonic atomizer J and long-time accumulation of E-liquid, when an electronic cigarette is started after not smoked for a long time, high power is required to quickly atomize the E-liquid on the ultrasonic atomizer J. Therefore, under the condition that the voltage value outputted by the existing booster circuit 2 is small, when the interval between two adjacent ON moments of the smoking switch 3 is greater than a preset time, the start speed of the ultrasonic atomizer J is slow. When it comes to the electronic cigarette, the specific phenomena are that the amount of smoke is little during the first few puffs, the amount of smoke is unstable, and the user experience is poor.

SUMMARY OF THE INVENTION

In a working control circuit for an existing ultrasonic atomizer, the voltage value outputted by a booster circuit is constant and the voltage value outputted by the booster circuit is small, so that the start speed of the ultrasonic atomizer is slow, the amount of smoke is little during the first few puffs, so the amount of smoke is unstable, and the user experience is poor. The objective of the present invention is to provide, against the above shortcomings of the prior art, a working control circuit for an ultrasonic atomizer and an ultrasonic electronic cigarette, wherein the start speed of the ultrasonic atomizer is fast, the ultrasonic atomizer will not be dry-burnt or its life will not be shortened due to excessive working voltage, and the amount of smoke is stable, more energy will be saved, and the user experience is good.

In order to solve the above technical problems, the technical solution adopted by the present invention is as follows:

A working control circuit for an ultrasonic atomizer comprises a power module, a booster circuit, a smoking switch, a controller, a drive circuit, and an LC oscillation circuit; the power module is electrically connected to the ultrasonic atomizer sequentially through the booster circuit, the drive circuit, and the LC oscillation circuit; the smoking switch is electrically connected to an input end of the controller, and an output end of the controller is electrically connected to an enable end of the booster circuit; the working control circuit further comprises a voltage regulator circuit for increasing a voltage value transmitted by the booster circuit to the drive circuit when the time interval between two adjacent ON moments of the smoking switch is longer than a preset time, an output end of the booster circuit is electrically connected to an input end of the drive circuit through the voltage regulator circuit, and the output end of the controller is electrically connected to a control end of the voltage regulator circuit. With the above structure, the voltage regulator circuit regulates the voltage output by the booster circuit to the drive circuit, which can solve the problem of small amount of smoke at the startup of the ultrasonic electronic cigarette due to insufficient power.

When the time interval between two adjacent ON moments of the smoking switch is longer than the preset time, the controller controls the voltage regulator circuit to work. The voltage outputted by the booster circuit is boosted by the voltage regulator circuit, so the voltage output to the drive circuit is boosted. The output power is increased, and the working voltage of the ultrasonic atomizer is boosted, so that the ultrasonic atomizer is started fast and emits smoke fast. The problems of little smoke and slow start of the ultrasonic electronic cigarette due to long time interval of each puff of smoke are solved.

When the time interval is not longer than the preset time, the ultrasonic atomizer that has been preheated can generate a large amount of smoke only with low power. At this time, the controller controls the voltage regulator circuit not to work. The voltage output by the booster circuit is directly output to the drive circuit, so the input voltage of the drive circuit is low, and the output power of the drive circuit is reduced. So that the smoke atomized by the ultrasonic atomizer is substantially the same as that when it is just started, the amount of smoke is stable, and the user experience is good. At the same time, more energy can be saved, and the ultrasonic atomizer will not be dry-burnt or its life will not be shortened due to excessive working voltage.

As a preferred mode, the voltage regulator circuit comprises a first MOS transistor, a first resistor and a second resistor, a reference level feedback end of the booster circuit is grounded through a third resistor, the voltage output end of the booster circuit is electrically connected to the reference level feedback end of the booster circuit through a fourth resistor, a gate of the first MOS transistor and one end of the second resistor are both electrically connected to the output end of the controller, a drain of the first MOS transistor is electrically connected to the voltage output end of the booster circuit through the first resistor, a source of the first MOS transistor is connected between the third resistor and the fourth resistor, and the other end of the second resistor is grounded.

With the above structure, the voltage regulator circuit regulates the voltage output by the booster circuit to the drive circuit, which can solve the problem of small amount of smoke at the startup of the ultrasonic electronic cigarette due to insufficient power. The working principle of the voltage regulator circuit is as follows:

Since the feedback voltage reference value Vrf outputted by the reference level feedback end of the booster circuit is relatively small (close to zero volt), the present invention regulates upper resistance, which is the resistance of the fourth resistor or the total resistance of the first resistor and the fourth resistor connected in parallel. Depending on whether the difference between the voltage output by the I/O port of the controller and the Vrf is greater than the Vgs of the first MOS transistor, the first MOS transistor is driven to be turned on (if Vrf>Vgs) or off (if Vrf<Vgs), so that the first resistor and the fourth resistor are connected in parallel to regulate the voltage (if Vrf>Vgs), or the fourth resistor separately regulates the voltage (if Vrf<Vgs).

When the time interval between two adjacent ON moments of the smoking switch is longer than the preset time, the controller outputs a low level signal to the gate of the first MOS transistor. The first MOS transistor is turned off, and the first resistor is disconnected. The resistance of the fourth resistor is greater than the total resistance of the first resistor and the fourth resistor connected in parallel, and the sampling level Vrf remains unchanged, so the voltage output by the booster circuit to the drive circuit is increased according to the relational expression that the voltage ratio is equal to the resistance ratio. The output power is increased, so that the working voltage of the ultrasonic atomizer is increased. The ultrasonic atomizer is started fast and emits smoke fast, and the problems of little smoke amount and slow start speed of the ultrasonic electronic cigarette due to long time interval of each puffs of smoke are solved.

When the time interval is not longer than the preset time, the ultrasonic atomizer that has been preheated can generate a large amount of smoke only with low power. At this time, the controller outputs a high level signal to the gate of the first MOS transistor. The first MOS transistor is turned on. The first resistor is connected in parallel with the fourth resistor to reduce the upper resistance. The voltage output by the booster circuit to the drive circuit is decreased according to the relational expression that the voltage ratio is equal to the resistance ratio. The output power is decreased, so that the smoke atomized by the ultrasonic atomizer is substantially the same as that when it is just started, the amount of smoke is stable, and the user experience is good. At the same time, more energy can be saved, and the ultrasonic atomizer will not be dry-burnt or its life will not be shortened due to excessive working voltage.

The voltage regulation scheme of the present invention is suitable for the booster circuit with the low sampling reference level Vrf. Using the characteristic of constant Vrf, a MOS transistor circuit is designed to regulate the upper resistance of a sampling resistor, and the output voltage of the booster circuit is dynamically regulated with the simple circuit.

Further, the working control circuit also comprises a first filter circuit connected between the voltage output end of the booster circuit and the input end of the drive circuit.

The first filter circuit is used to filter noise of a voltage signal output to the drive circuit after boosted by the booster circuit.

Further, the working control circuit also comprises a second filter circuit connected between the input end of the booster circuit and an output end of the power module.

The second filter circuit is used to filter noise of a voltage signal output by the power module to the booster circuit.

As a preferred mode, the first filter circuit comprises a first capacitor, a second capacitor, a third capacitor, and a fourth capacitor; one ends of the first capacitor, the second capacitor, the third capacitor, and the fourth capacitor are all connected between the voltage output end of the booster circuit and the input end of the drive circuit; and the other ends of the first capacitor, the second capacitor, the third capacitor, and the fourth capacitor are all grounded.

As a preferred mode, the second filter circuit comprises a fifth capacitor and a sixth capacitor, one ends of the fifth capacitor and the sixth capacitor are both connected between the input end of the booster circuit and the output end of the power module, and the other ends of the fifth capacitor and the sixth capacitor are both grounded.

Based on the same inventive concept, the present invention further provides an ultrasonic electronic cigarette, comprising the working control circuit for the ultrasonic atomizer.

Compared with the prior art, in the present invention, the start speed of the ultrasonic atomizer is fast, the ultrasonic atomizer will not be dry-burnt or its life will not be shortened due to excessive working voltage, the amount of smoke is stable, more energy will be saved, the manufacturing process is simple, the use cost is reduced, and the user experience is good.

In which: 1 power module, 2 booster circuit, 3 smoking switch, 4 controller, 5 LC oscillation circuit, 6 voltage regulator circuit, 7 drive circuit, 8 first filter circuit, 9 second filter circuit, J ultrasonic atomizer, Q1 first MOS transistor, Q2 second MOS transistor, R1 first resistor, R2 second resistor, R3 third resistor, R4 fourth resistor, R5 fifth resistor, R6 sixth resistor, R7 seventh resistor, R8 eighth resistor, R9 ninth resistor, C1 first capacitor, C2 second capacitor, C3 third capacitor, C4 fourth capacitor, C5 fifth capacitor, C6 sixth capacitor, C7 seventh capacitor, C8 eighth capacitor, C9 ninth capacitor, C10 tenth capacitor, C11 eleventh capacitor, C12 twelfth capacitor, L inductor, U booster chip, D diode; M1, M2 and M3 are nodes connecting FIG. 3(a) and FIG. 3(b).

DETAILED DESCRIPTION OF EMBODIMENTS

Figure 1:
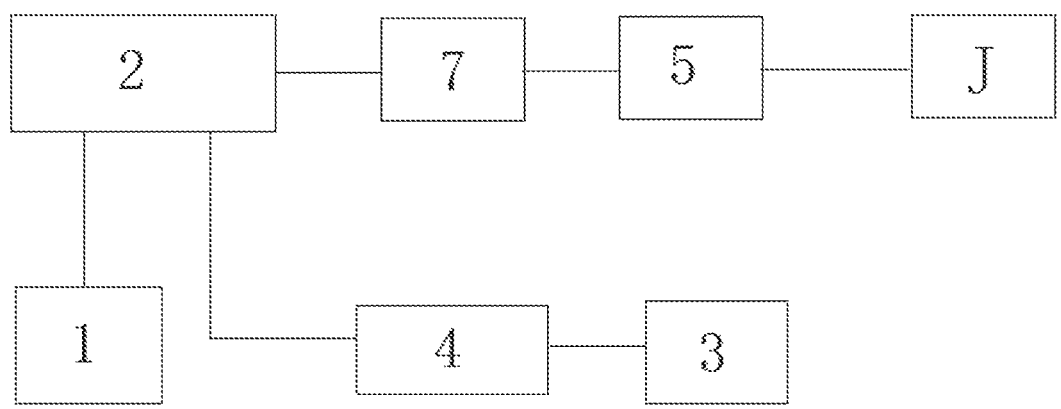
FIG. 1 is a block diagram of a working control circuit for an existing ultrasonic atomizer.
Figure 2:
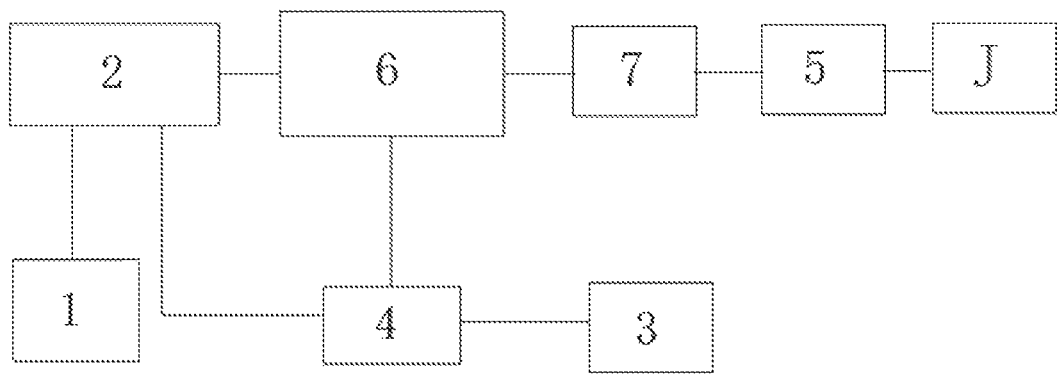
FIG. 2 is a block diagram of a working control circuit for an ultrasonic atomizer according to the present invention.
Figure 3A:
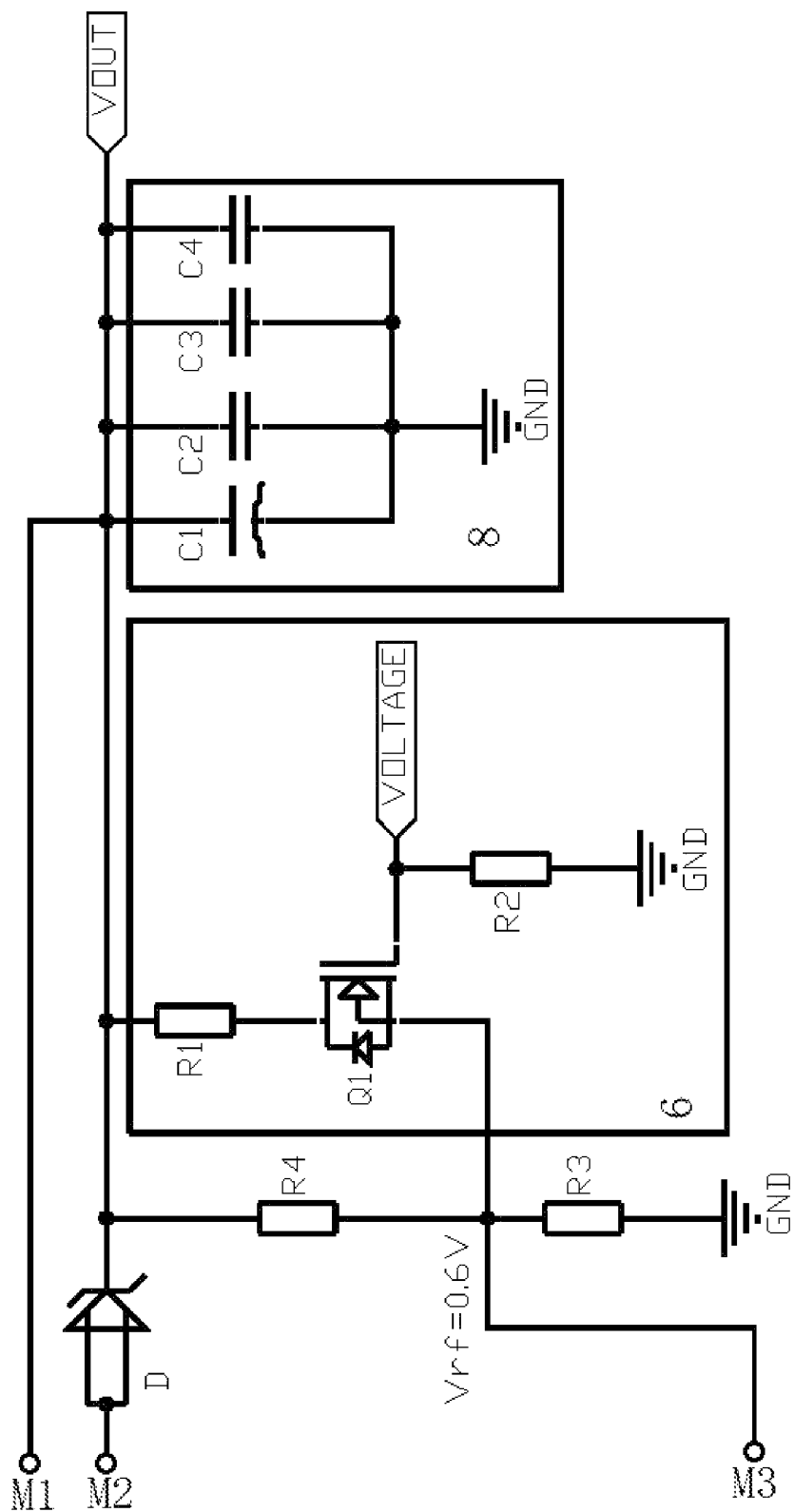
FIG. 3(a) is one part of a diagram of a specific circuit connection structure of a booster circuit and a voltage regulator circuit according to the present invention.
Figure 3B:
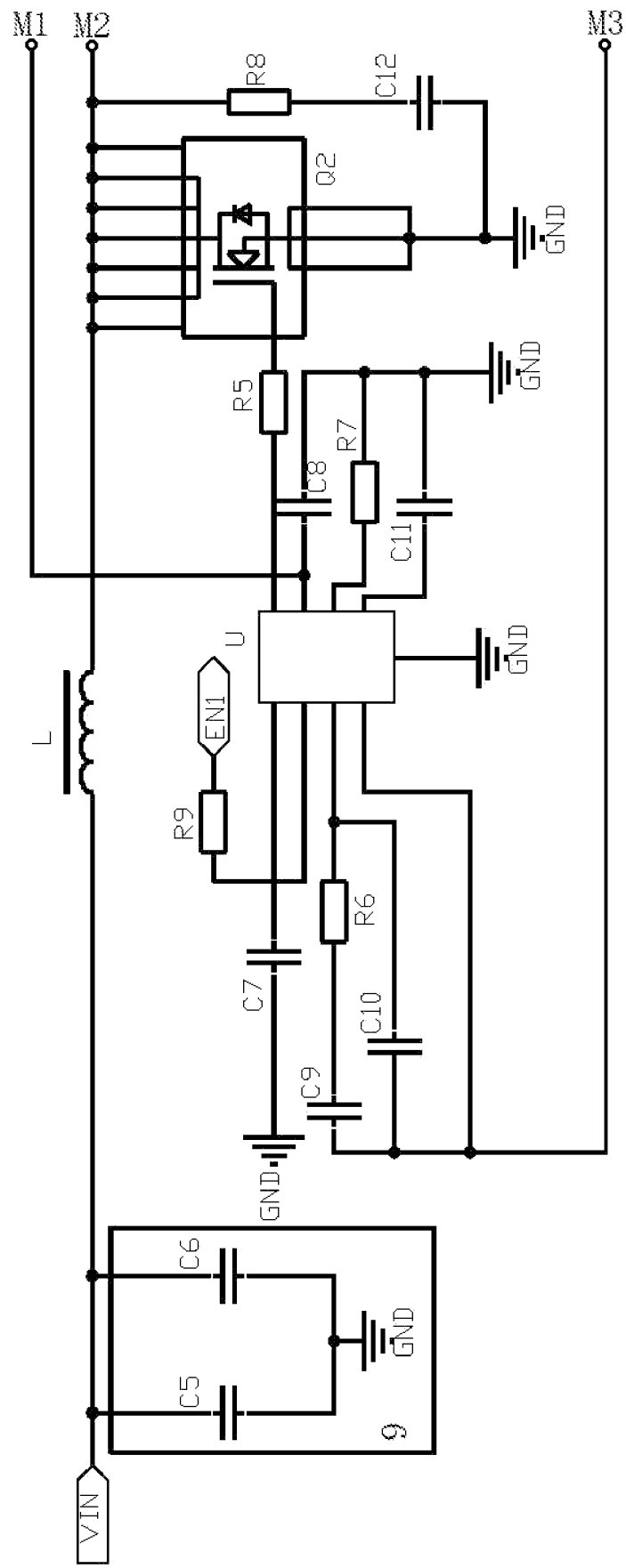
FIG. 3(b) is the other part of the diagram of the specific circuit connection structure.

As shown in FIGS. 2, 3(a) and 3(b), a working control circuit for an ultrasonic atomizer in an ultrasonic electronic cigarette comprises a power module 1, a booster circuit 2, a smoking switch 3, a controller 4, a drive circuit 7, and an LC oscillation circuit 5. The power module 1 is electrically connected to the ultrasonic atomizer J sequentially through the booster circuit 2, the drive circuit 7, and the LC oscillation circuit 5. The smoking switch 3 is electrically connected to an input end of the controller 4, and an output end of the controller 4 is electrically connected to an enable end of the booster circuit 2. The working control circuit further comprises a voltage regulator circuit 6 for increasing a voltage value transmitted by the booster circuit 2 to the drive circuit 7 when the time interval between two adjacent ON moments of the smoking switch 3 (in this embodiment, it is the time interval between adjacent button pressing moments) is longer than a preset time, an output end of the booster circuit 2 is electrically connected to an input end of the drive circuit 7 through the voltage regulator circuit 6, and the output end of the controller 4 is electrically connected to a control end of the voltage regulator circuit 6.

As shown in FIGS. 3(a) and 3(b), the voltage regulator circuit 6 comprises a first MOS transistor Q1, a first resistor R1, and a second resistor R2. The voltage output end of the booster circuit 2 is electrically connected to the input end of the drive circuit 7, a reference level feedback end of the booster circuit 2 is grounded through a third resistor R3, and the voltage output end of the booster circuit 2 is electrically connected to the reference level feedback end of the booster circuit 2 through a fourth resistor R4. A gate of the first MOS transistor Q1 and one end of the second resistor R2 are both electrically connected to the output end of the controller 4, a drain of the first MOS transistor Q1 is electrically connected to the voltage output end of the booster circuit 2 through the first resistor R1, a source of the first MOS transistor Q1 is connected between the third resistor R3 and the fourth resistor R4, and the other end of the second resistor R2 is grounded.

The power module 1 is composed of a single lithium battery charging-discharging circuit and a protection circuit. The protection circuit has overcharge and overvoltage protection functions, so to prevent overcurrent and short circuit of the back-end circuit. The booster circuit 2 provides power of about 30 W for the back-end high-frequency LC oscillation circuit 5 by means of single lithium battery boosting.

The controller 4 achieves low power consumption and safety protection of an entire circuit board by controlling the indication of an LED light and the on/off of the MOS transistor through a 51-core single-chip microcomputer, and detects the voltage and current changes of the ultrasonic atomizer J in real time to prevent dry burning and overload of the ultrasonic atomizer J, and provides a PWM signal for the back-end drive circuit 7 and achieves real-time frequency tracking by power detection.

In this embodiment, the LC oscillation circuit 5 is a high-frequency separately excited bilateral oscillation circuit. The high-frequency externally excited bilateral oscillation circuit makes the static capacitor of the ultrasonic atomizer J resonate with the inductor and the capacitor to form sine waves by continuous turn on/off the MOS transistor, thereby effectively driving the ultrasonic atomizer J to oscillate and atomize E-liquid.

The drive circuit 7 amplifies two paths of PWM signals provided by the controller 4 through a drive chip, to drive the inductance and capacitance in the back-end high-frequency separately excited bilateral oscillation circuit to resonate with the ultrasonic atomizer J, so that the ultrasonic atomizer J performs full-wave oscillation to achieve an atomization effect.

The working control circuit for the ultrasonic atomizer further comprises a first filter circuit 8 connected between the voltage output end of the booster circuit 2 and input end of the drive circuit 7 to filter noise of a voltage signal output after boosted by the booster circuit 2. The first filter circuit 8 comprises a first capacitor C1, a second capacitor C2, a third capacitor C3, and a fourth capacitor C4. One ends of the first capacitor C1, the second capacitor C2, the third capacitor C3, and the fourth capacitor C4 are all connected between the voltage output end of the booster circuit 2 and input end of the drive circuit 7. The other ends of the first capacitor C1, the second capacitor C2, the third capacitor C3, and the fourth capacitor C4 are all grounded.

The working control circuit for the ultrasonic atomizer further comprises a second filter circuit 9 connected between the input end of the booster circuit 2 and the output end of the power module 1 to filter noise of a voltage signal output by the power module 1 to the booster circuit 2. The second filter circuit 9 comprises a fifth capacitor C5 and a sixth capacitor C6, one ends of the fifth capacitor C5 and the sixth capacitor C6 are both connected between the input end of the booster circuit 2 and the output end of the power module 1, and the other ends of the fifth capacitor C5 and the sixth capacitor C6 are both grounded.

The booster circuit 2 comprises an inductor L, a diode D, a booster chip U, a second MOS transistor Q2, a fifth resistor R5, a sixth resistor R6, a seventh resistor R7, an eighth resistor R8, a ninth resistor R9, a seventh capacitor C7, an eighth capacitor C8, a ninth capacitor C9, a tenth capacitor C10, an eleventh capacitor C11, and a twelfth capacitor C12, wherein one end of the second resistor R2 is connected to an enable end of the booster chip U, and the other end of the second resistor R2 is connected to the controller 4. VIN is a voltage output from the power module 1; EN1 is an enable signal from the controller 4; VOLTAGE is a voltage regulation signal from the controller 4; and VOUT is a voltage signal output by the booster circuit 2 to the drive circuit 7.

In the present invention, the working principle of the voltage regulator circuit 6 is as follows:

Since the feedback voltage reference value Vrf outputted by the reference level feedback end of the booster circuit 2 is relatively small (close to zero volt), the present invention regulates upper resistance, which is the resistance of the fourth resistor R4 or the total resistance of the first resistor R1 and the fourth resistor R4 connected in parallel. Depending on whether the difference between the voltage output by the I/O port of the controller 4 and the Vrf is greater than the Vgs of the first MOS transistor Q1, the first MOS transistor Q1 is driven to be turned on (if Vrf>Vgs) or off (if Vrf<Vgs), so that the first resistor R1 and the fourth resistor R4 are connected in parallel to regulate the voltage(if Vrf>Vgs), or the fourth resistor R4 separately regulates the voltage (if Vrf<Vgs).

When the time interval between two adjacent ON moments of the smoking switch 3 is longer than the preset time, the controller 4 outputs a low level signal to the gate of the first MOS transistor Q1. The first MOS transistor Q1 is turned off, and the first resistor R1 is disconnected. The resistance of the fourth resistor R4 is greater than the total resistance of the first resistor and the fourth resistor connected in parallel, and the sampling level Vrf remains unchanged, so the voltage output by the booster circuit 2 to the drive circuit 7 is increased according to the relational expression that the voltage ratio is equal to the resistance ratio. The output power is increased, so that the working voltage of the ultrasonic atomizer J is increased. The ultrasonic atomizer J is started fast and emits smoke fast, and the problems of little smoke amount and slow start speed of the ultrasonic electronic cigarette due to long time interval of each puffs of smoke are solved.

When the time interval is not longer than the preset time, the ultrasonic atomizer J that has been preheated can generate a large amount of smoke only with low power. At this time, the controller 4 outputs a high level signal to the gate of the first MOS transistor Q1. The first MOS transistor Q1 is turned on. The first resistor R1 is connected in parallel with the fourth resistor R4 to reduce the upper resistance. The voltage output by the booster circuit 2 to the drive circuit 7 is decreased according to the relational expression that the voltage ratio is equal to the resistance ratio. The output power is decreased, so that the smoke atomized by the ultrasonic atomizer J is substantially the same as that when it is just started, the amount of smoke is stable, and the user experience is good. At the same time, more energy can be saved, and the ultrasonic atomizer J will not be dry-burnt or its life will not be shortened due to excessive working voltage.

The voltage regulation scheme of the present invention is suitable for the booster circuit 2 with the low sampling reference level Vrf. Using the characteristic of constant Vrf, a MOS transistor circuit is designed to regulate the upper resistance of a sampling resistor, and the output voltage of the booster circuit 2 is dynamically regulated with the simple circuit.

The embodiments of the present invention are described above with reference to the drawings, but the present invention is not limited to the specific embodiments. The specific embodiments described above are merely illustrative but not limited. Many forms may also be made by those of ordinary skill in the art under the enlightenment of the present invention without departing from the purpose of the present invention and the scope of the claims, and all these forms fall into the scope of the present invention.

The invention claimed is:

1. A working control circuit for an ultrasonic atomizer, comprising:
    a power module (1),
    a booster circuit (2),
    a smoking switch (3),
    a controller (4),
    a drive circuit (7), and
    an LC oscillation circuit (5), wherein:
        the power module (1) is electrically connected to the ultrasonic atomizer (J) sequentially through the booster circuit (2), the drive circuit (7), and the LC oscillation circuit (5);
        the smoking switch (3) is electrically connected to an input end of the controller (4), and
        an output end of the controller (4) is electrically connected to an enable end of the booster circuit (2);
        it is characterized in that the working control circuit further comprises a voltage regulator circuit (6) for increasing a voltage value transmitted by the booster circuit (2) to the drive circuit (7) when a time interval between two adjacent ON moments of the smoking switch (3) is longer than a preset time,
        an output end of the booster circuit (2) is electrically connected to an input end of the drive circuit (7) through the voltage regulator circuit (6), and
        the output end of the controller (4) is electrically connected to a control end of the voltage regulator circuit (6).

2. The working control circuit for the ultrasonic atomizer according to claim 1, wherein:
    the voltage regulator circuit (6) comprises a first MOS transistor (Q1), a first resistor (R1), and a second resistor (R2), a reference level feedback end of the booster circuit (2) is grounded through a third resistor (R3),
    a voltage output end of the booster circuit (2) is electrically connected to the reference level feedback end of the booster circuit (2) through a fourth resistor (R4),
    a gate of the first MOS transistor (Q1) and one end of the second resistor (R2) are both electrically connected to the output end of the controller (4),
    a drain of the first MOS transistor (Q1) is electrically connected to the voltage output end of the booster circuit (2) through the first resistor (R1),
    a source of the first MOS transistor (Q1) is connected between the third resistor (R3) and the fourth resistor (R4), and
    another end of the second resistor (R2) is grounded.

3. The working control circuit for the ultrasonic atomizer according to claim 1, further comprising a first filter circuit (8) connected between the voltage output end of the booster circuit (2) and the input end of the drive circuit (7).

4. The working control circuit for the ultrasonic atomizer according to claim 1, further comprising a second filter circuit (9) connected between an input end of the booster circuit (2) and an output end of the power module (1).

5. The working control circuit for the ultrasonic atomizer according to claim 3, wherein:
    the first filter circuit (8) comprises a first capacitor (C1), a second capacitor (C2), a third capacitor (C3), and a fourth capacitor (C4);
    one ends of the first capacitor (C1), the second capacitor (C2), the third capacitor (C3), and the fourth capacitor (C4) are all connected between the voltage output end of the booster circuit (2) and the input end of the drive circuit (7); and
    another ends of the first capacitor (C1), the second capacitor (C2), the third capacitor (C3), and the fourth capacitor (C4) are all grounded.

6. The working control circuit for the ultrasonic atomizer according to claim 4, wherein:
    the second filter circuit (9) comprises a fifth capacitor (C5) and a sixth capacitor (C6),
    one ends of the fifth capacitor (C5) and the sixth capacitor (C6) are both connected between the input end of the booster circuit (2) and the output end of the power module (1), and
    another ends of the fifth capacitor (C5) and the sixth capacitor (C6) are both grounded.

7. An ultrasonic electronic cigarette, comprising a working control circuit for the ultrasonic atomizer, the working control circuit comprising:
    a power module (1),
    a booster circuit (2),
    a smoking switch (3),
    a controller (4),
    a drive circuit (7), and
    an LC oscillation circuit (5), wherein:
        the power module (1) is electrically connected to the ultrasonic atomizer (J) sequentially through the booster circuit (2), the drive circuit (7), and the LC oscillation circuit (5);
        the smoking switch (3) is electrically connected to an input end of the controller (4), and
        an output end of the controller (4) is electrically connected to an enable end of the booster circuit (2);
        it is characterized in that the working control circuit further comprises a voltage regulator circuit (6) for increasing a voltage value transmitted by the booster circuit (2) to the drive circuit (7) when a time interval between two adjacent ON moments of the smoking switch (3) is longer than a preset time, an output end of the booster circuit (2) is electrically connected to an input end of the drive circuit (7) through the voltage regulator circuit (6), and the output end of the controller (4) is electrically connected to a control end of the voltage regulator circuit (6).

8. The ultrasonic electronic cigarette according to claim 7, wherein:

the voltage regulator circuit (6) comprises a first MOS transistor (Q1), a first resistor (R1), and a second resistor (R2), a reference level feedback end of the booster circuit (2) is grounded through a third resistor (R3), a voltage output end of the booster circuit (2) is electrically connected to the reference level feedback end of the booster circuit (2) through a fourth resistor (R4), a gate of the first MOS transistor (Q1) and one end of the second resistor (R2) are both electrically connected to the output end of the controller (4), a drain of the first MOS transistor (Q1) is electrically connected to the voltage output end of the booster circuit (2) through the first resistor (R1), a source of the first MOS transistor (Q1) is connected between the third resistor (R3) and the fourth resistor (R4), and another end of the second resistor (R2) is grounded.

9. The ultrasonic electronic cigarette according to claim 7, wherein the working control circuit further comprises a first filter circuit (8) connected between the voltage output end of the booster circuit (2) and the input end of the drive circuit (7).

10. The ultrasonic electronic cigarette according to claim 7, wherein the working control circuit further comprises a second filter circuit (9) connected between an input end of the booster circuit (2) and an output end of the power module (1).

11. The ultrasonic electronic cigarette according to claim 9, wherein:

the first filter circuit (8) comprises a first capacitor (C1), a second capacitor (C2), a third capacitor (C3), and a fourth capacitor (C4);

one ends of the first capacitor (C1), the second capacitor (C2), the third capacitor (C3), and the fourth capacitor (C4) are all connected between the voltage output end of the booster circuit (2) and the input end of the drive circuit (7); and another ends of the first capacitor (C1), the second capacitor (C2), the third capacitor (C3), and the fourth capacitor (C4) are all grounded.

12. The ultrasonic electronic cigarette according to claim 10, wherein:

the second filter circuit (9) comprises a fifth capacitor (C5) and a sixth capacitor (C6), one ends of the fifth capacitor (C5) and the sixth capacitor (C6) are both connected between the input end of the booster circuit (2) and the output end of the power module (1), and another ends of the fifth capacitor (C5) and the sixth capacitor (C6) are both grounded.

* * * * *